UNITED STATES PATENT OFFICE.

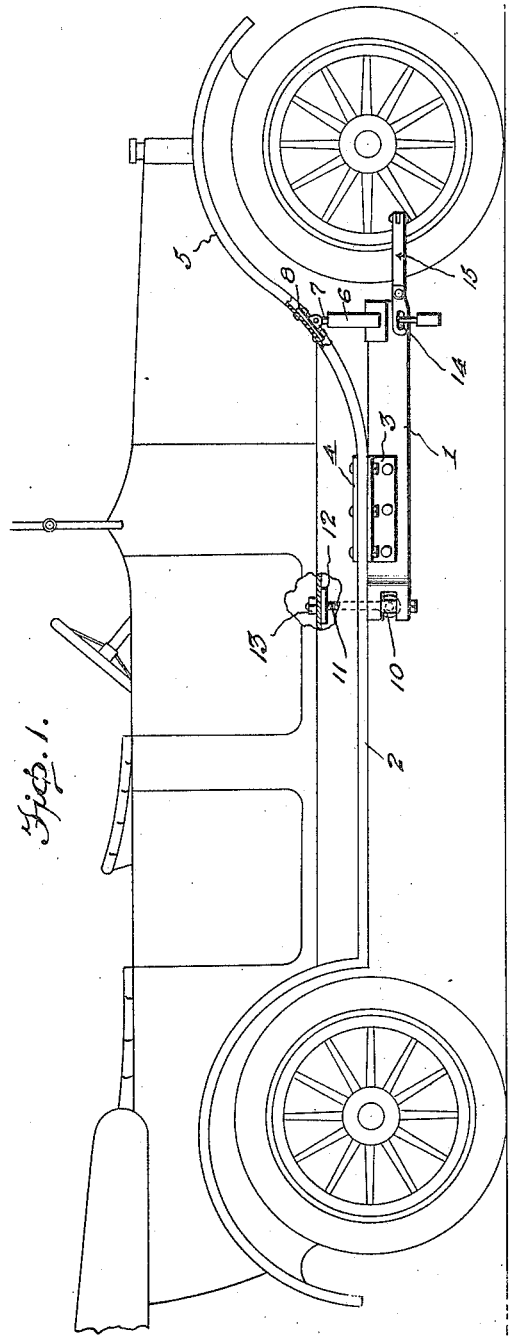
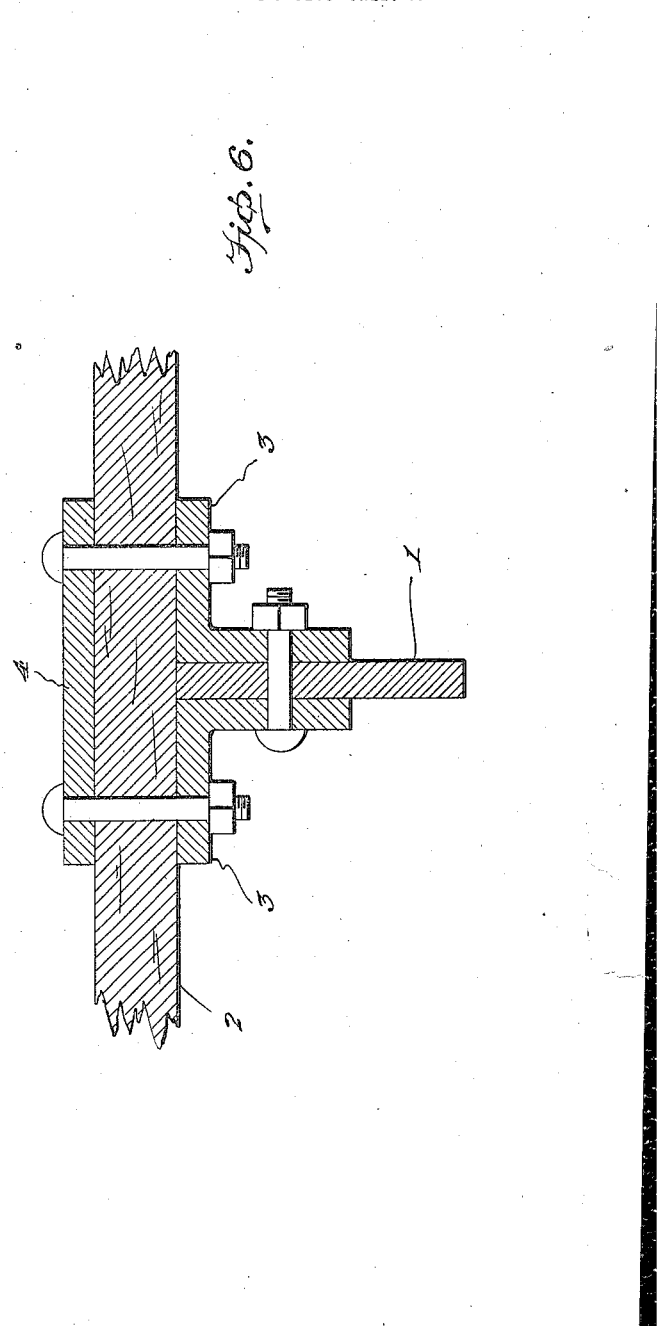

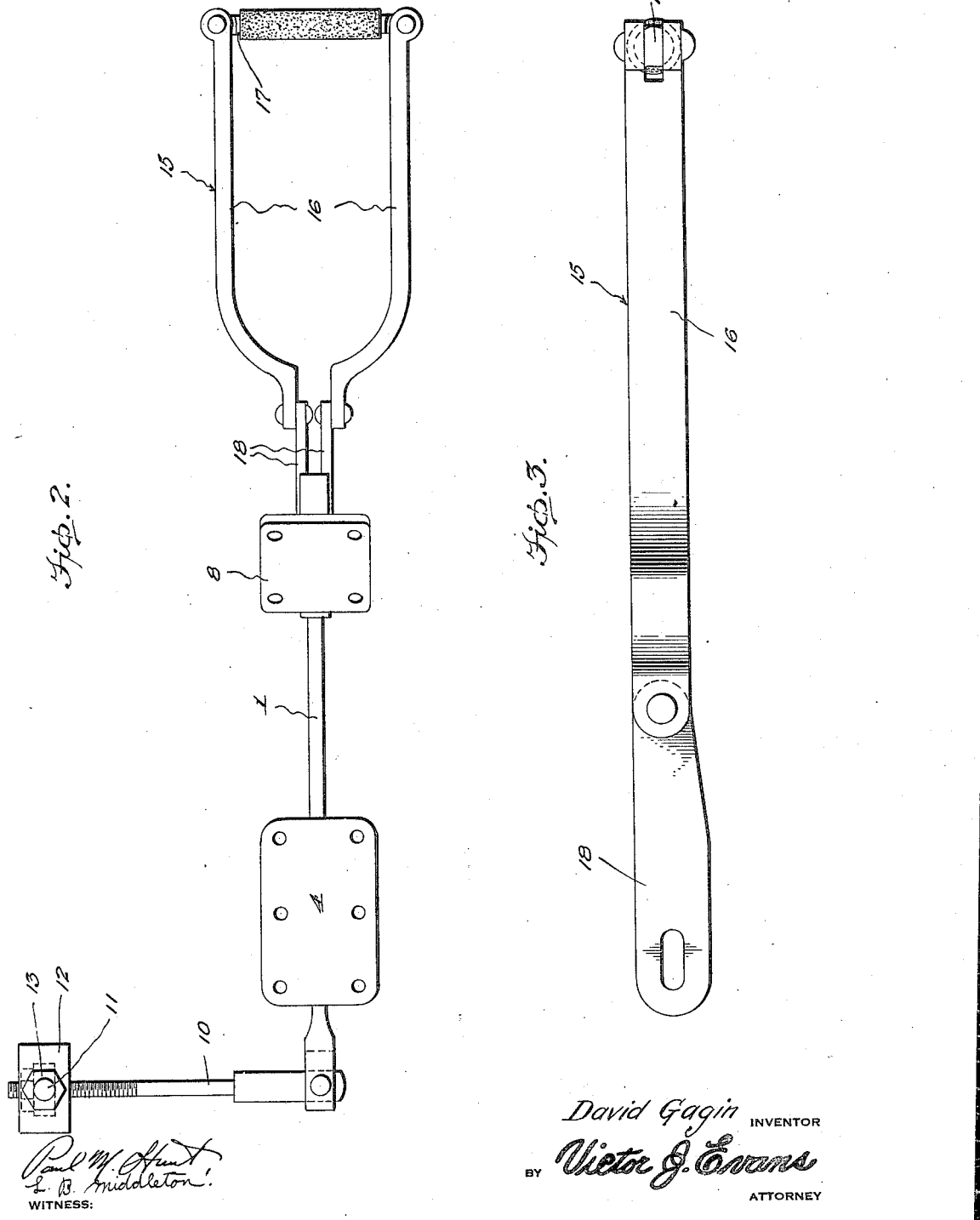

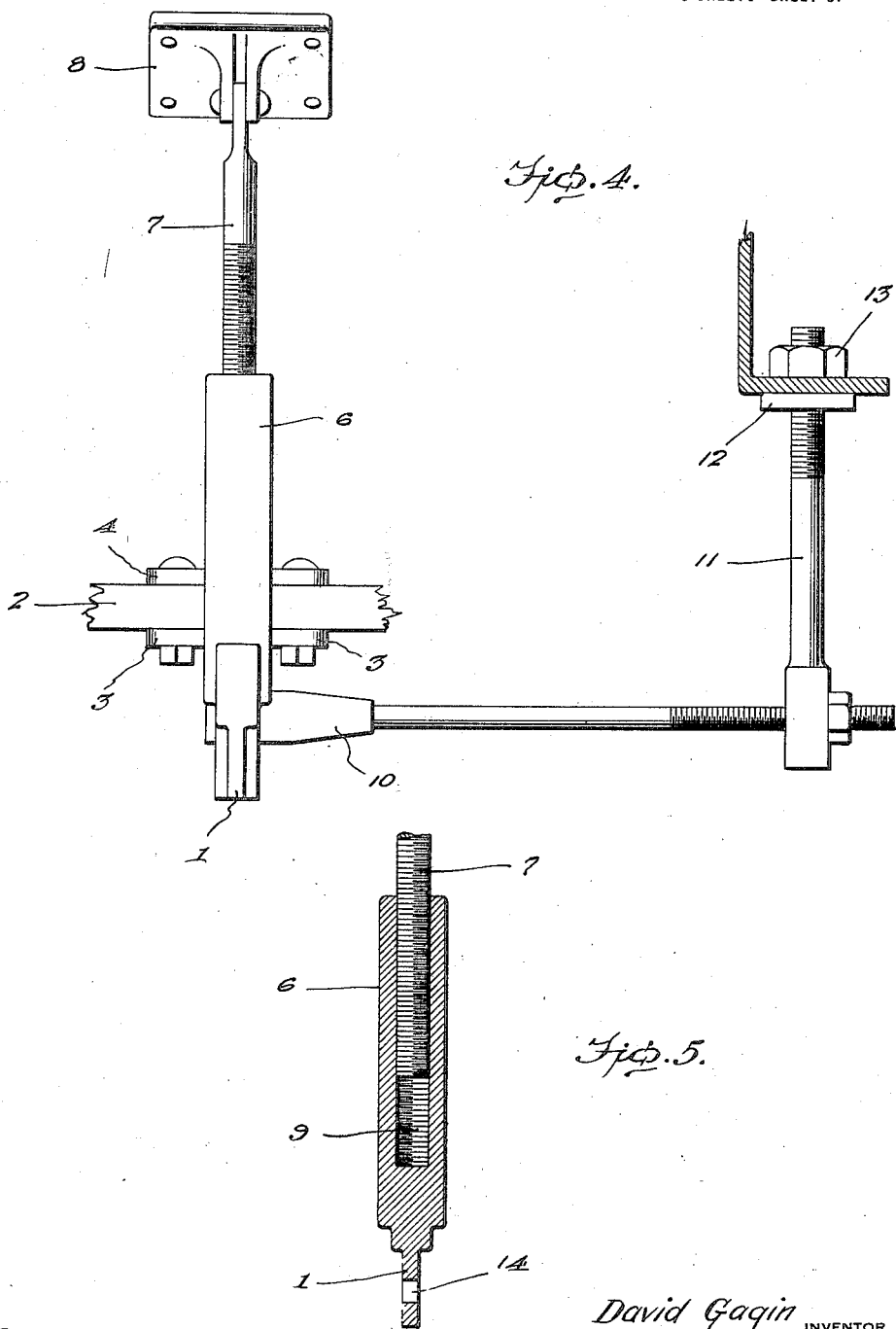

DAVID GAGIN, OF BOSTON, MASSACHUSETTS, ASSIGNOR OF ONE-FIFTH TO THOMAS J. DUGGAN, OF BOSTON, MASSACHUSETTS, AND ONE-FIFTH TO JAMES A. AICARDI, JR., OF DORCHESTER, MASSACHUSETTS.

LOCK FOR MOTOR VEHICLES.

1,424,295. Specification of Letters Patent. Patented Aug. 1, 1922.

Application filed May 28, 1921. Serial No. 473,224.

*To all whom it may concern:*

Be it known that I, DAVID GAGIN, a citizen of the United States, residing at Boston, in the county of Suffolk and State of Massachusetts, have invented new and useful Improvements in Locks for Motor Vehicles, of which the following is a specification.

This invention relates to a lock for motor vehicles, the general object of the invention being to provide means for locking one of the front wheels against rotary movement so that it will be impossible for an unauthorized person to move the vehicle either under its own power or by towing it.

Another object of the invention is to provide means for engaging a wheel and other means secured to the under part of the running board and fender to which the wheel engaging means are adapted to be locked.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic side view of an automobile showing my lock in use.

Figure 2 is a view of the device arranged in the position in which it is placed on the vehicle.

Figure 3 is an enlarged view of the wheel engaging member.

Figure 4 is an end view of the parts which are secured to the vehicle body.

Figures 5 and 6 are detail views.

In these views 1 indicates a bar which is secured to the underside of the running board 2 of the vehicle by the angle strips 3 and the plate 4, the angle strips being secured to the sides of the bar and the running board being clamped between said strips and the plate by bolts, screws or the like. The front end of bar 1 is connected with the front fender 5 by the post 6, which is bolted to the bar 1, the rod 7 and the plate 8 which is pivotally secured to the upper end of the rod and is bolted to the fender. Rod 7 is screw threaded to engage the screw threaded bore 9 of post 6 so that the rod can be adjusted longitudinally in said post. The rear end of the bar 1 is forked and one end of a link 10 is pivotally mounted between the prongs of the fork, the other end of said link being screw threaded and passing through an opening in the enlarged lower end of a bolt 11 which has its upper end connected with a part of the frame of the vehicle by means of a pipe 12 and the nut 13. It will thus be seen that the bar 1 is firmly connected with the bore of the vehicle so that it will require considerable time and much labor to remove it from the vehicle. The front end of the bar 1 is provided with a slot 14.

The wheel engaging part of the device consists of a yoke 15 having its side bars 16 hinged to the cross piece 17 so that said side bars can be separated to permit the yoke to be placed around the rim and tire of a wheel. The other ends of the side bars are pivotally secured to the slotted pieces 18 which are adapted to embrace the front end of bar 1 with the slots in said pieces registering with slot 14 in said bar so that a padlock or the like can be placed through the slots to lock the said pieces to said bar and thus prevent the yoke member from being removed from the wheel.

From the above it will be apparent that when the yoke member has been placed on the wheel and locked to the bar 1 the wheel will be prevented from rotating so that it will be impossible to move the vehicle either under its own power or by towing it. The cross piece of the yoke member and the side bars, if necessary, can be covered with leather or the like to prevent marring of the painted surface of the wheel.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A lock of the class described comprising a member, means for connecting said member with a part of the vehicle, a yoke member for engaging a wheel of the vehicle and means for locking said yoke member to the first mentioned member.

2. A lock of the class described comprising a member, means for securing the same to a part of the motor vehicle, a yoke member adapted to engage a part of a wheel, said yoke member having a hinged part and means for locking the ends of the yoke member to the first mentioned member.

3. A lock of the class described comprising a bar having an opening therein, means for securing said bar to a part of the motor vehicle, a yoke member having one of its side bars hinged to its cross piece so that the yoke member can be placed around the rim and tire of a wheel and slotted pieces connected with the ends of the side bars of the yoke and adapted to embrace the first mentioned bar with the slots in alignment with the opening therein so that a lock can be placed through said opening and slots.

4. A lock of the class described comprising a bar having a slot at one end, means for connecting a part of the bar with the running board of a motor vehicle, adjustable means for connecting the front end of the bar with the fender of a motor vehicle, means for connecting the rear end of the bar with a part of the frame of the vehicle, a yoke member for engaging a wheel of the vehicle, slotted pieces connected with the ends of the side bars of the yoke member and arranged to embrace the slotted end of the bar with the slots in alignment and a block having a part passing through said slots.

In testimony whereof I affix my signature.

DAVID GAGIN.